Sept. 25, 1934.　　　　L. LAFONT　　　　1,974,678
PUMP
Filed Sept. 28, 1931
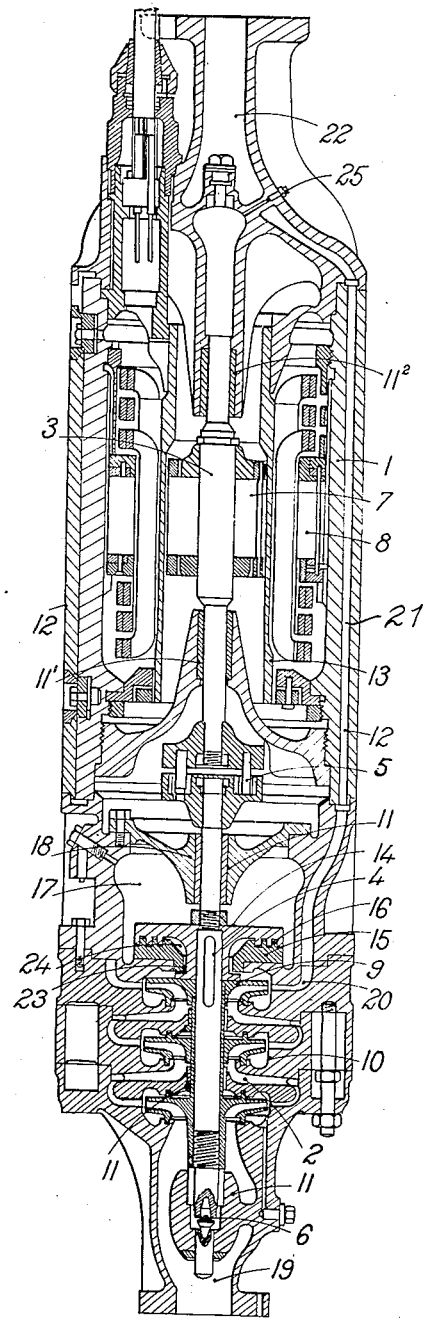
L. Lafont
INVENTOR
By: Marks & Clark
Attys.

Patented Sept. 25, 1934

1,974,678

UNITED STATES PATENT OFFICE 1,974,678

PUMP

Lucien Lafont, Lille, France

Application September 28, 1931, Serial No. 565,669
In France October 4, 1930

1 Claim. (Cl. 103—87)

This invention relates to groups of electric pumps of the vertical type adapted to be used, submerged or otherwise, in mining operations, under water, and in places exposed to a gritty atmosphere or one likely to present dangers of explosion, and which are designed in such manner that they can work with a minimum of wear without any attention and lubrication owing to the omission of all thrust and journal ball bearings and to the perfect equilibrium of the moving parts of the pump and of the electric motor.

In constructing the electric pump group forming more particularly the object of the invention, the rotor of the electric motor is coupled directly to the shaft of the movable part of the pump, and a plate keyed on to the shaft of the pump receives the total or partial pressure of the fluid delivered which tends, in ordinary working, to raise it as well as the shaft to which it is keyed, and to disengage the shaft from its supporting thrust bearing, thus avoiding any wear. The delivery water, the pressure of which is exerted on the plate lifting the shaft of the pump, escapes through the bearings of the rotors of the pump and of the electric motor, said bearings being provided with suitable grooves through which the water may flow, cooling these and to a certain extent ensuring their lubrication. Furthermore, the escaping delivery water mentioned above passes through the air gap of the electric motor and effects the cooling of this motor, at the same time producing equilibrium of the rotor of this motor. The result is that the bearings of the electric motor are subject to practically no wear in consequence of the circulation of water which passes through them, and of the perfect equilibrium of the rotor produced by the circulation of water in the air gap. The electric motor is also cooled by the delivery water from the pump which passes through longitudinal channels provided in its outer jacket and extending over practically the whole of the periphery of this jacket.

The invention relates in addition to certain variations of construction which will be more particularly described hereinafter.

The accompanying drawing shows, in longitudinal section, an electric pump group in accordance with the invention.

The electric pump group, which is of the vertical type, comprises essentially an electric motor 1 arranged at the upper part, and a multiple stage pump 2 at the lower part, fitted respectively on shafts 3 and 4 connected by a flexible coupling 5. The unit formed by the rotor of the electric motor and of the pump is supported at the lower end of the shaft 4 on a thrust ball bearing 6 when the electric pump system is at rest. The rotor of the electric motor is indicated at 7 and the stator at 8, while the movable parts of the pump are represented at 9 and the fixed parts at 10. The shafts of the pump and of the electric motor are mounted in plain bearings 11 of suitable number and carried by ribs or partitions of the casing 12 which encloses the electric pump group aggregate. The stator 8 dips into an oil bath and is insulated from the rotor by a cylindrical partition 13. The bearings 11, $11^1$, $11^2$ are provided with channels or grooves (not shown), for an object which will be mentioned later. On the shaft 4 of the pumps, where they leave their jacket, is keyed a plate or disc 14, engaging, by circular ribs 16 forming baffles, in a fixed plate 15 fitted to the casing.

The pump is separated from the motor by a chamber 17 having partitions 18. The suction of the pump takes place at the lower part of the casing at 19, and the discharge of the last stage of the pump takes place through conduits 20 and 21 which are arranged longitudinally in suitable number on the periphery of the casing 12, so as to cool it before escaping through the discharge pipe 22. A part of the delivery water at the last stage of the pumps also penetrates through an annular conduit 23 into a chamber 24 situated under the plate 14.

The operation of the electric pump group is as follows:

On starting, a part of the water or of the liquid coming from the pump through the impeller 9, traverses the annular passage 23 to enter the chamber 24, and the pressure existing in this space acts on the plate 14 and lifts, through the intermediary of this plate, the whole of the shafts 3 and 4 of the movable parts of the pump and of the rotor of the electric motor.

Leakage passes through the baffles 16 of the plate 14, enters the chamber 17 of the casing, and then traverses the grooves of the bearings 11 and $11^1$. This water is then thrown into the gap of the electric motor to pass through the last bearing $11^2$. At the outlet, the discharge of this water is regulated by means of a needle valve 25 which also permits variation of the internal pressure in the motor. Alternatively, a needle valve may be provided in the chamber 17 of the casing to cause the pressure in this casing to be varied independently of that existing in the motor.

The principal output of the pump is conducted into the channels 20, 21, made in the external casing 12 of the motor, and then passes to the delivery pipe 22. In this way, the cooling of the stator of the electric motor is ensured.

This cooling is all the more efficient if the windings of the stator dip into a closed chamber filled with oil or an insulating fluid which improves the insulation and transmits to the casing the heat developed by the working of the motor both in the plates and in the windings.

From the above description, it will be seen that in ordinary working the movable part of the pump and the rotor of the motor, connected together through the intermediary of the coupling 5, are raised and kept in equilibrium without the bearing 6, which no longer plays any part, and is only useful when starting and stopping. Thus, in normal work there is no friction at the movable part on this bearing 6.

There is produced, on the other hand, a damping of the vibration of the shaft supporting the electric motor by interposing, in the annular air gap of the stator, the current of water which has traversed the bearing 11 and serves to lift the movable part, which water passes towards the outside after having traversed the bearings 11¹ and 11² and assisted in the cooling of the rotor. The suppression of the damping of these vibrations is one of the reasons why the wear of the bearings is obviated.

The disposition of the channels in the external casing of the motor permits passage towards the discharge of the total output of the pump by sweeping over the external surfaces of the stator chamber.

The result of this arrangement is that the cooling of this stator chamber is all the more energetic the more the output required from the pump increases, so that simultaneously with the increase of the load of the motor, the cooling effect is increased.

It is to be understood that certain variations of construction may be made in the electric pump group above described without passing outside the scope of the invention. The invention would be equally applicable to groups in which the electric motor is situated beneath the pump, on the suction side. In this latter case, the total output drawn by the pump entering in the suction orifice passes into the channels of the stator jacket, to flow towards the suction inlet of the turbine of the pump. The whole output thus aids the cooling of the motor stator as in the first case.

It is this characteristic which is particularly advantageous in that the number of calories capable of being carried away by the liquid pumped increases with the output of the pump, and, consequently, simultaneously with the increase in the load of the motor.

The lifting of the movable part of the group by a delivery escape is applicable not only to electric motors in general having a vertical axis, but to other rotary motors adapted to be coupled to pumps, the axis of which is vertical.

The passage through the bearings by the water and the equilibrium of a rotating movable device by the direct circulation of water around this member may be applied with advantage to all kinds of motors, or to groups comprising a motor and a pump.

I claim:

A pump of the class described comprising a casing having a pump chamber therein, a vertically disposed electric motor in the casing, a vertical shaft connected with the rotor of the motor, a multiple stage pump in the pump chamber including a vertical shaft connected with the rotor shaft of the motor, a thrust bearing in the inlet end of the casing and upon which the pump shaft rests and serves to sustain the weight of the movable parts of the pump and motor when the pump is inactive, bearings for the rotor and pump shafts, a chamber in the casing between the pump stages and motor, a fixed plate in the bottom of the chamber having annular ribs and grooves in its top, a disc fixed to and rotatable with the pump shaft and having circular ribs fitting into the grooves in the fixed plate, a second chamber between the disc and fixed plate and communicating with the pump chamber and the first mentioned chamber to permit leakage of fluid between the disc and plate and means for causing the fluid to flow upwards from said chambers immediately around said shafts and said rotor between the stationary parts and the movable parts and to escape above the rotor, as and for the purpose set forth.

LUCIEN LAFONT.